United States Patent
Oh et al.

(10) Patent No.: US 7,155,226 B1
(45) Date of Patent: Dec. 26, 2006

(54) METHOD AND SYSTEM FOR SERVING MULTIPLE SUBSCRIBER STATIONS UNDER A COMMON SUBSCRIBER ID

(75) Inventors: Dae-Sik Oh, Overland Park, KS (US); Leo Ray Anderson, Jr., Kansas City, MO (US)

(73) Assignee: Sprint Spectrum L.P., Overland, KS (US)

( * ) Notice: Subject to any disclaimer, the term of this patent is extended or adjusted under 35 U.S.C. 154(b) by 406 days.

(21) Appl. No.: 09/836,521

(22) Filed: Apr. 17, 2001

(51) Int. Cl.
*H04Q 7/20* (2006.01)
*H04M 1/00* (2006.01)

(52) U.S. Cl. ............... 455/445; 455/551; 455/461; 455/462; 455/463

(58) Field of Classification Search ............ 455/422.1, 455/445, 461, 550.1
See application file for complete search history.

(56) References Cited

U.S. PATENT DOCUMENTS

| | | | |
|---|---|---|---|
| 5,357,558 A | | 10/1994 | Yoshikawa |
| 5,454,032 A | * | 9/1995 | Pinard et al. .......... 379/167.05 |
| 5,657,373 A | | 8/1997 | Hermansson et al. |
| 5,699,407 A | * | 12/1997 | Nguyen ................ 455/462 |
| 5,805,582 A | | 9/1998 | Snelling et al. |
| 5,806,000 A | * | 9/1998 | Vo et al. .................. 455/466 |
| 5,845,207 A | | 12/1998 | Amin et al. |
| 5,943,620 A | * | 8/1999 | Boltz et al. ............... 455/445 |
| 6,393,275 B1 | * | 5/2002 | Alfred ..................... 455/422.1 |
| 6,501,946 B1 | | 12/2002 | Farah et al. |
| 6,580,908 B1 | * | 6/2003 | Kroll et al. ............... 455/435.1 |
| 6,671,523 B1 | | 12/2003 | Niepel et al. |
| 2001/0041560 A1 | | 11/2001 | Tarkiainen et al. |
| 2002/0153410 A1 | | 10/2002 | Santini |
| 2003/0043763 A1 | * | 3/2003 | Grayson ................ 370/329 |

FOREIGN PATENT DOCUMENTS

EP 1 058 465 A2 12/2000

OTHER PUBLICATIONS

Wireless Review, Faceless Activation, http://www.wirelessreview.com/ microsites/magazinearticle.asp?mode=print& magazinearti printed from the World Wide Web on Mar. 20, 2003.
Telespree, "Intelligent Service Manager (ISM) and Secure Instant Wireless Access^SM Protocol," Technical Overview, 2002.
Telespree, "telespree Intellignet Service Manager—Dynamic Device Activation and Provisioning Software for Wireless Voice & Data Networks," 2002.
Telespree, "Reduce Wireless Activation Costs," http://www.telespree.com/solutions2.1_p.htm, printed from the World Wide Web in Aug. 2003.

(Continued)

*Primary Examiner*—Charles Appiah
*Assistant Examiner*—Bryan Fox

(57) ABSTRACT

A method for serving multiple mobile stations under a common mobile identification number (MIN). A service provider assigns the common MIN to multiple mobile stations and maintains a subscriber profile that associates the MIN with the electronic serial numbers (ESNs) of the mobile stations. However, the service provider allows the MIN to be associated with at most one mobile station that is arranged to respond to a MIN-based termination message. As a result, when the service provider seeks to terminate a call through signaling keyed to the MIN, only one of the mobile stations will respond (e.g., begin to ring). At the same time, all of the mobile stations having the common MIN can originate calls through signaling keyed to their MIN and ESN (since the MIN/ESN pair should uniquely identify the originating station).

17 Claims, 7 Drawing Sheets

OTHER PUBLICATIONS

Telespree, "Telespreee Completes Seamless Integration of Intelligent Activation and Acquisition Solution Over CDMA2000 1X Network," Dec. 2, 2003, http:www.telespree.com/release_12.02.02.htm, printed from the World Wide Web.

"Telespree announce Instant Activation Software for CDMA2000 1X Networks," http://www.3gnewsroom.com/3g_news/oct_02/news_2589.shtml, printed from the World Wide Web on Mar. 20, 2003.

Telespree, "ISM Activation Manager," http://www.telespree.com/products1.2.htm, printed from the World Wide Web on Feb. 18, 2003.

Telespree, "Telespree Secure Instant Wireless Access[SM] (SIWA[SM]) Protocol," SIWA Overview, Version 1.0, 2002.

WirelessWeek, "Telespree Aims to Cut Activation Costs," Oct. 28, 2002, http://www.wirelessweek.com/index.asp?layout=articlePrint&articleID=CA254726, printed from the World Wide Web.

Lucent Technologies, "Wireless Intelligent Networks—SHLR Authentication Center Utility SPA User's Guide," issue 6.0, Jun. 2003 (see, e.g., Auth_Failure_Override and Auth_Active_for_Mobile descriptions at pp. 38-39, allowing use of duplicate MIN/ESN combination, and allowing bypass of MIN authentication.).

Office Action from U.S. Appl. No. 10/403,767, dated May 7, 2004.

* cited by examiner

| ESN | TYPE | STATE (REGISTERED?) | LOCATION (MSC-ID) |
|---|---|---|---|
| ESN-14 | MT | — | — |
| ESN-16 | — | — | — |
| ESN-18 | — | — | — |

MIN = XXX-XXX-XXXX

FIG. 4

METHOD AND SYSTEM FOR SERVING MULTIPLE SUBSCRIBER STATIONS UNDER A COMMON SUBSCRIBER ID

BACKGROUND

1. Field of the Invention

The present invention relates to telecommunications and, more particularly, to methods of communicating with mobile stations such as cellular telephones, personal digital assistants (PDAs), cellular modems, and personal computers for instance.

2. Description of Related Art

Traditionally, each mobile station in a telecommunications network is associated with a unique Electronic Serial Number (ESN) and a unique Mobile Identification Number (MIN). The ESN, which is typically hard-coded into the mobile station, identifies the mobile station as a unique physical device and usually includes a manufacturer code and a manufacturer-assigned serial number. The MIN, on the other hand, is typically assigned to the mobile station by a service provider and functions as a subscriber ID for billing and for receiving calls. In many cases, the MIN will be a telephone directory number.

When a call is placed to a mobile station, a service carrier may alert the mobile station by broadcasting a paging message that is keyed to the MIN of the mobile station. The mobile station may then detect its MIN in the paging message and respond to the incoming call. On the other hand, when a call is placed from the mobile station, the mobile station typically transmits both its ESN and its MIN to the service provider. The service provider may then authenticate the ESN/MIN pair and responsively allow the call to proceed.

With the growing popularity of mobile communications, individual users of mobile stations are finding themselves with multiple different mobile stations, each having been assigned a respective MIN. For instance, a user may have a cellular telephone with one MIN, a PCMCIA-card wireless modem with another MIN, and a PDA wireless modem adapter with yet another MIN. Notwithstanding the fact that each of these separate devices will have a unique ESN, each device under existing arrangements would also have a unique MIN.

The resulting proliferation of MINs is likely to present a problem for telecommunication service providers. Already, the quantity of available directory numbers throughout many areas is beginning to dwindle. The allocation of many more MINs for mobile communication devices will only further diminish the pool of available directory numbers.

SUMMARY

In accordance with an exemplary embodiment of the present invention, a method and system is provided for concurrently serving multiple mobile stations under a common MIN, so as help conserve the quantity of available MINs. This can be accomplished by allowing MIN-based terminations to only one of the mobile stations, while allowing MIN-based originations from any of the mobile stations.

Allowing MIN-based originations from any of the mobile stations can be accomplished by programming a service provider's network to recognize multiple mobile station ESNs as valid with a given MIN. For instance, the network may maintain a subscriber profile for the MIN, indicating multiple ESNs (i.e., multiple separate subscriber stations) that are valid with that MIN. Conventionally, when any one of the mobile stations seeks to originate a communication, as noted above, it will send its ESN/MIN pair to the network. The network may then authorize the ESN/MIN pair based on the subscriber profile, and allow the communication to proceed (and bill the communication to the subscriber account associated with the MIN).

Restricting MIN-based terminations to only one of the multiple mobile stations can, in turn, be accomplished by allowing only one of the mobile stations to respond to a MIN-based termination message (or, more generally, by allowing only one of the mobile stations to receive terminations of any type). For instance, the service provider may allow the subscriber profile for a given MIN to associate with the MIN at most one mobile station that is set to respond to MIN-based termination messages (such as a cellular telephone that can receive and respond to a ring signal, for instance). The service provider may require all other mobile stations associated with the MIN to block or to otherwise not respond to MIN-based termination messages. Those other mobile stations may be arranged to not respond to terminations altogether or to only respond to terminations that are not MIN-based. That way, when the service provider receives a request to terminate a call to the given MIN, the service provider can send a conventional MIN-based termination message, to which only the one mobile station will respond, thereby avoiding termination conflicts among the mobile stations.

By way of example, a service carrier may assign a common MIN to three mobile stations, only one of which is arranged to detect and respond to a paging message sent to the MIN, while the other two of which may be arranged to respond to a termination message sent to particular IP addresses. The service carrier may list the ESNs of the three mobile stations in a subscriber profile record for the MIN and may then allow the three mobile stations to operate concurrently. Any of the three mobile stations may make a MIN-based origination (e.g., an outgoing voice call), since the station's unique ESN would be sent with its MIN to the service provider's network, thereby allowing authentication based on the subscriber profile. When the service provider receives a request to terminate a call to the MIN (such as a incoming telephone call to the MIN), the service provider may send out a termination message (such as a paging message) to the MIN, and only the one capable mobile station will respond to the termination message.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 4 is a subscriber profile table illustrating how a subscriber ID may be associated with multiple subscriber stations;

DETAILED DESCRIPTION OF EXEMPLARY EMBODIMENT

Figure 1:
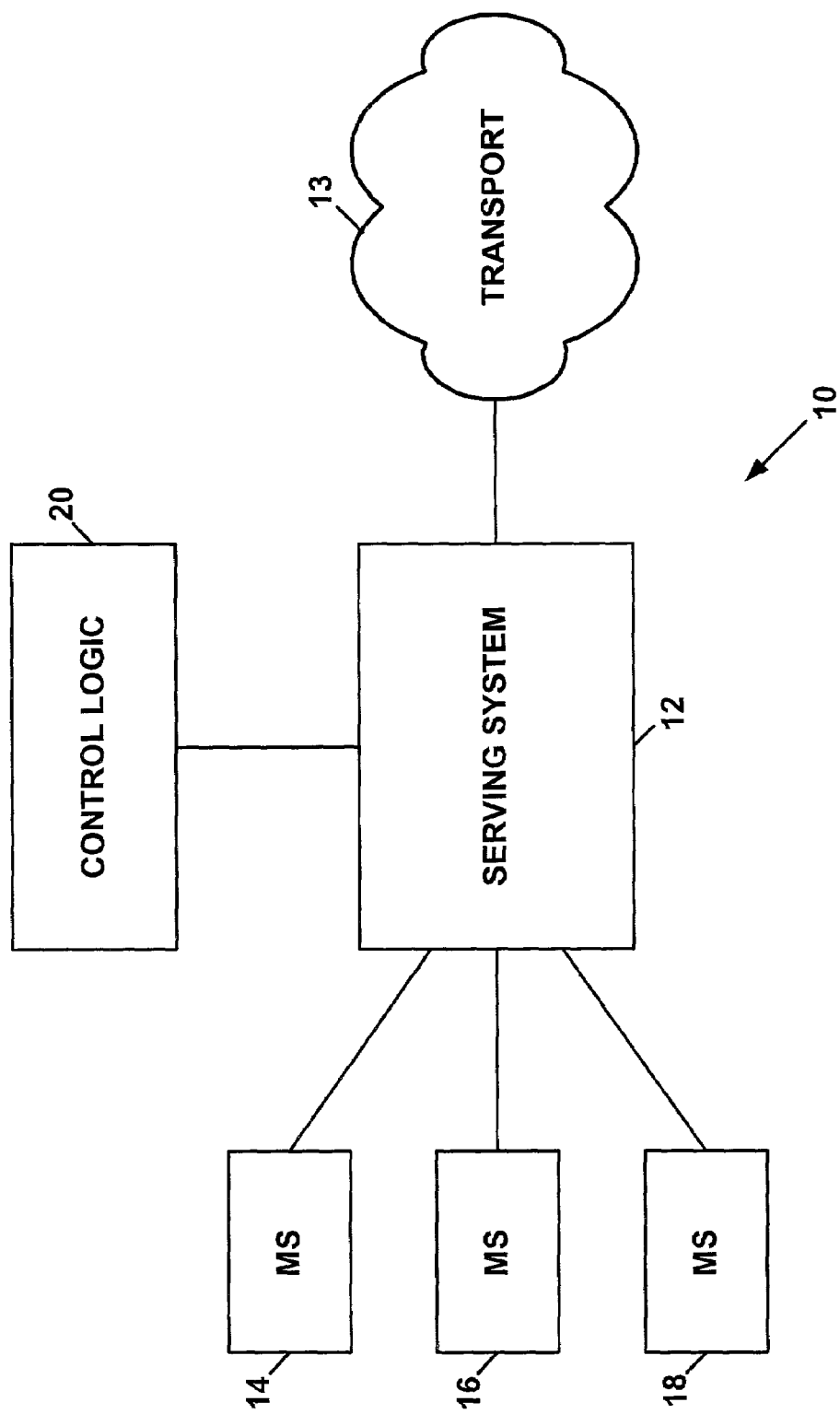
FIG. 1 is a generalized block diagram of a communications system in which the exemplary embodiment can be employed.

Referring to the drawings, FIG. 1 illustrates a generalized block diagram of a communications system 10 in which an exemplary embodiment of the present invention can be employed. System 10 is shown to include a serving system 12, which may be coupled with one or more transport networks 13 such as the public switched telephone network (PSTN) and/or the Internet for instance. Serving system 12 may serve a plurality of subscriber stations, three of which are shown by way of example as subscriber stations 14, 16 and 18. Further, serving system 12 may include and/or have access to a set of control logic 20. Control logic 20 may generally function to authorize communications to or from the subscriber stations via serving system 12 and may therefore function to allow or disallow communications with subscriber stations in accordance with the exemplary embodiment.

Figure 2:
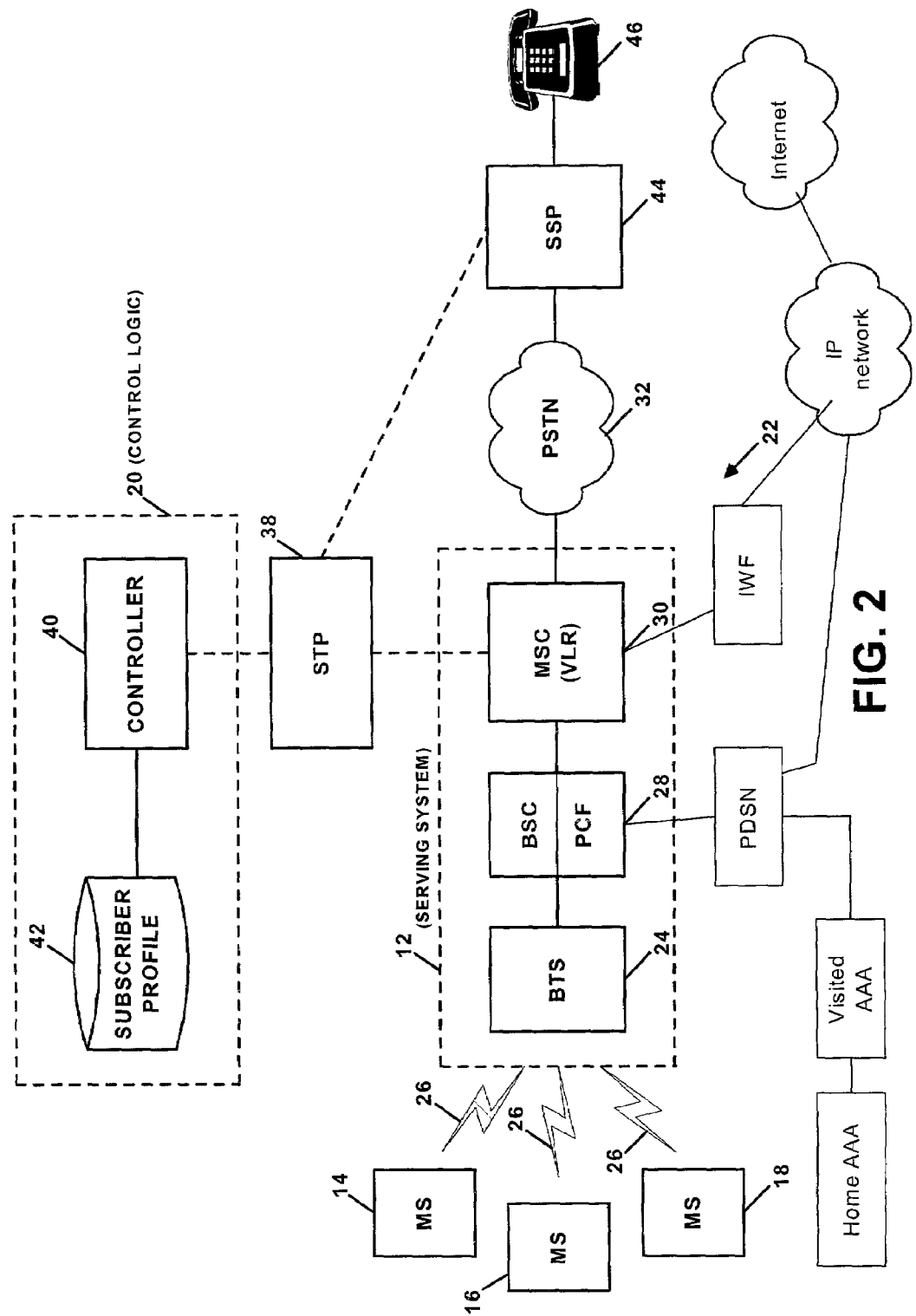
FIG. 2 is a block diagram depicting an example implementation of the communication system of FIG. 1.

The generalized arrangement of FIG. 1 can be implemented in a variety of forms and can vary from that shown in FIG. 1. Referring to FIG. 2, for example, the arrangement may take the form of a wireless telecommunications network 22. At least a portion of wireless network 22 may be owned and operated by a telecommunications service provider.

As shown in FIG. 2, wireless network 22 may include a base station transceiver (BTS) 24, which may function to establish a radiation pattern that defines a cell site. Subscriber stations 14, 16 and 18 may then be mobile stations operating in the cell site and may communicate with the BTS via an air interface 26. BTS 24 may in turn be coupled with a base station controller (BSC) 28, which may then be coupled with a mobile switching center (MSC) 30. MSC 30 may provide connectivity with the PTSN 32.

As further illustrated, MSC 30 may be coupled with a signaling system, represented by a signal transfer point (STP) 38, which may in turn be coupled with a controller 40 such as a home location register (HLR) and/or a service control point (SCP). Controller 40 may maintain or otherwise have access to a subscriber profile store 42, which may set forth parameters defining services, attributes, locations and states of subscribers and terminals. Further, controller may embody or have access to an authentication control function.

Also connected to PSTN 32 may be other switches, which may serve other subscriber stations, whether landline or wireless. For instance, as shown in FIG. 2, a Class 5 landline switch, also known as a service switching point (SSP) 44, may be coupled to PSTN 32 and may serve a landline telephone station 46. SSP 44 may conventionally be coupled with the signaling system 38, to facilitate signaling communication between MSC 30 and SSP 44, and to facilitate signaling communication between SSP 44 and controller 40, for instance.

Each of mobile stations 14, 16 and 18 may be hard coded with a unique ESN and may be initially activated by the service provider. In doing so, the service provider may conventionally assign a unique MIN to the mobile station and may establish in the profile store 42 a record or other profile associating the MIN with the ESN and indicating service parameters for the subscriber (i.e, for the MIN).

To appreciate how the exemplary embodiment of the invention may operate in practice, it is instructive to first review how some conventional signaling works to facilitate operation of a mobile station, such as station 14, for instance.

When mobile station 14 is first powered on in, or moves into, the cell defined by BTS 24, the mobile station may send a system access or registration message via the air interface to the BTS. The registration message may carry a parameter that identifies the mobile station's ESN and MIN. The message may pass from the BTS to the BSC and in turn to the MSC. The MSC may then forward the message via the signaling system 38 to controller 40, while also identifying the location (e.g., the identity of the MSC) where the mobile station is operating. The controller may then responsively validate the mobile station by ensuring that the MIN and ESN are listed together in the subscriber profile. Further, the controller may set a flag in the profile for that MIN to indicate that the mobile station is operating in the location indicated. Additionally, the controller may send a local version of the mobile station's subscriber profile via the signaling system to MSC to be stored in a visitor location register (VLR, not shown).

When mobile station 14 seeks to originate a voice call to a directory number on PSTN 32, the mobile station may conventionally send an origination message via air interface 26 to BTS 24, and the message would in turn pass to the BSC and then to the MSC. The origination message will conventionally carry a parameter identifying the mobile's station's ESN and MIN. When the MSC receives the message, it may validate the request by reference to the local subscriber profile for the MIN, as provided by controller 40. Alternatively, it may send an origination-request message via signaling system 38 to controller 40, and controller 40 may validate the request by reference to the subscriber profile for the MIN and then notify MSC of the successful validation. (The MSC and/or the controller may also apply various supplemental services, such as number translation or call blocking, for instance).

With successful validation, the MSC may then set up the call to the directory number via PSTN 32, typically employing industry standard ISUP signaling for instance. For instance, assuming that the dialed digits correspond to landline telephone 46, MSC 30 may engage in ISUP signaling communications with SSP 44, to set up the call between the mobile station and the landline station. When a call path is available, the switches may then connect the call, and communication may begin.

Different signaling occurs when the wireless network receives a request to terminate (i.e., to connect) a voice call to mobile station 14. Assume, for instance, that a user at landline telephone 46 seeks to place a voice call to mobile station 14 by dialing the directory number of mobile station 14, which is the MIN of the mobile station. SSP 44 would receive the dialed digits and may then engage in ISUP signaling communication via STP 38 with MSC 30, asking MSC 30 to set up a call to the MIN. Conventionally, this signaling communication would not identify the ESN of mobile station 14.

When MSC 30 receives the request to terminate the voice call to the designated MIN, the MSC may first confirm by reference to its local profile store (e.g., a VLR) that the MIN is located in its service area. The MSC may also send a termination-request message via signaling system 38 to controller 40, and controller 40 may apply supplemental services to the call attempt (such as blocking the call, for instance). The MSC may then signal to BSC 28 to send a MIN-based termination message over the air interface, and BSC 28 would cause BTS 24 to broadcast the MIN-based termination message over air interface 26.

In a CDMA system compatible with industry standard IS-95 (EIA/TIA Interim Standard 95), for instance, the MIN-based termination message may be a general page message, and the BTS may broadcast the message on the paging channel of the sector in which mobile station 14 is operating. The general page message may carry parameters that define, among other things, (i) the destination MIN, (ii) a traffic channel to which the mobile station should tune so as to connect to the call, (iii) a directive (e.g., a BYPASS_ALERT_ANSWER (BAA) flag) for the mobile station to tune to that traffic channel, and (iv) a directive (e.g., a CALL_ALERT_INDICATOR (CAI) flag) for the mobile station to ring, so as to alert a user of the incoming call.

When mobile station 14 receives such a general page message, it may responsively enter the designated traffic channel and begin to ring. A user may then press the TALK button on the mobile station, which may cause the mobile station to complete the connection, allowing the user at landline telephone 46 to talk with the user at mobile station 14.

In accordance with the exemplary embodiment, the wireless network may impose restrictions that effectively allow mobile stations 14, 16 and 18 to all operate under a common MIN. As noted above, according to the exemplary embodiment, one way to accomplish this is to allow only one of the mobile stations to respond to MIN-based terminations.

In the exemplary embodiment, each mobile station will either be arranged to respond to a MIN-based termination message or will be arranged to not respond to a MIN-based termination message. In other words, a mobile station may either work to facilitate termination of a call in response to a MIN-based termination message, or not.

One way for a mobile station to be able to respond to a MIN-based termination message is for the mobile station to respond to parameters such as those described above in an IS-95 general page message. In particular, with the signaling arrangement described above, a mobile station may be programmed to detect its MIN in a general page message and to responsively determine whether the CAI and BAA flags are set in the message. If the BAA flag is set, the mobile station may respond by tuning to the designated traffic channel. And if the CAI is set, the mobile station may respond by beginning to ring. (If either of these flags is not set, the mobile station may be programmed to not respond at all, or to take some other action.) Other methods of responding to a MIN-based termination message are possible as well.

Conversely, one way for a mobile station to not respond to a MIN-based termination message is for the mobile station to not respond to such parameters in an IS-95 general page message. For instance, with the signaling arrangement described above, a mobile station may be programmed to ignore the CAI flag in a general page message. Thus, even if the general page message carries the mobile station's MIN, the mobile station may be programmed to disregard a CAI flag in the message. Consequently, the mobile station will not ring. Similarly, the mobile station may be programmed to ignore the BAA flag, so that it will not switch to the designated traffic channel. The process of not responding to a MIN-based termination message may involve ignoring one or both of these flags in a general page message or may involve disregarding or not acknowledging other such parameters or entire termination messages keyed to the MIN of the mobile station.

According to the exemplary embodiment, multiple mobile stations can operate concurrently under a common MIN, provided that only one (i.e., at most one) of the mobile stations is arranged to respond to a MIN-based termination message. Thus, all of the mobile stations may originate calls through signaling keyed to the MIN and to their respective ESN. But only one of the mobile stations can terminate calls through signaling keyed to the MIN. In this way, conflicts between the mobile stations can be avoided.

This restriction is unlikely to burden the typical subscriber, because it is unlikely that a typical subscriber will have more than one mobile station to which calls will need to be terminated based on the subscriber's MIN. For example, as noted in the background section above, a typical subscriber might have a cellular telephone, a PCMCIA card wireless modem, and a PDA wireless modem adapter. Of these devices, it is likely that only one, namely, the cellular telephone, will need to be able to accept MIN-based terminations. The others are largely data devices and will typically not need to accept MIN-based terminations. Rather, they will typically use MIN-based signaling only to originate communications. For instance, the subscriber may originate a communication via the PCMCIA wireless modem or PDA wireless modem, so as to connect with an e-mail server and to download e-mail messages, or to connect with a web server and to access the Internet. (It is also possible that these other devices may receive termination messages that are not MIN based. For example, if a mobile station has an assigned IP address and sits on a packet-switched network, it might be possible to send an IP-based message to the mobile station at that IP address without the need for reference to a MIN.)

Thus, if all three of these devices are assigned a common MIN (each device being programmed with the same MIN), but only the cellular telephone is arranged to respond to a MIN-based termination message, the three devices can operate concurrently.

In accordance with the exemplary embodiment, a service provider may impose this restriction for a given MIN by allowing only one of the mobile stations that is registered in the profile for the MIN to be able to respond to a MIN-based termination message. The service provider may do this in a variety of ways. For instance, when the service provider initially adds the ESN of a mobile station to a given MIN (e.g., when first creating the profile for that MIN, or when adding the ESN to an existing profile for the MIN), the service provider may employ provisioning-logic (machine-executed and/or human-executed) that disallows the addition of the ESN if both of the following criteria are met:

(i) the MIN is already associated with an ESN for a mobile station that is arranged to respond to a MIN-based termination message; and (ii) the ESN to be added is the ESN of a mobile station that is arranged to respond to a MIN-based termination message.

To facilitate determining whether the MIN is already associated with an ESN for a mobile station that is arranged to respond to a MIN-based termination message, the service provider may maintain or have access to records indicating, for each given ESN, whether the associated mobile station is arranged to respond to a MIN-based termination message.

For example, the profile for the MIN may include a flag for each associated ESN, indicating whether or not the mobile station that has that ESN is arranged to respond to MIN-based terminations. As another example, a separate list of ESNs can indicate, for each ESN, whether the associated mobile station is arranged to respond to a MIN-based termination message.

Because a service provider will usually be the entity that programs the mobile station with an assigned MIN, the service provider should know whether or not the mobile station is arranged to respond to a MIN-based termination message. The service provider may therefore set a flag for the respective ESN in the subscriber profile or other record.

In turn, when the subscriber seeks to add a new mobile station to the MIN, the service provider should know whether or not the new mobile station is arranged to respond to a MIN-based termination message and may use that information to decide whether to add the mobile station's ESN to the subscriber profile. If the profile already reflects that the MIN is associated with an ESN for a mobile station that is arranged to respond to a MIN-based termination message, then the service provider may refuse to assign the new mobile station to that MIN. Otherwise, the service provider may assign the new mobile station to the MIN.

Another way for a service provider to allow only one of the mobile stations under a common MIN to be able to respond to a MIN-based termination message is for the service provider to dynamically restrict registration (operation/activation). Again, to facilitate this, the service provider may maintain records indicating, for each given ESN, whether the associated mobile station is arranged to respond to a MIN-based termination message. In turn, when each such mobile station registers (e.g., on power-up) or de-registers (e.g., on power-down), the service provider may set a flag in the profile indicating whether the mobile station is registered or not. Faced with an attempt to register a mobile station that is arranged to respond to a MIN-based termination message, the service provider may determine whether the another mobile station that is arranged to respond to a MIN-based termination message is already registered for that MIN. If so, the service provider may refuse to allow the requested registration.

Advantageously, in this way, a subscriber's MIN can even be associated with more than one mobile station that arranged to respond to a MIN-based termination message, because only one such mobile station will be registered at any given time. Thus, for instance, a subscriber can have two cellular telephones that are both capable of receiving voice calls at the same directory number, provided that only one is registered at a time. (Alternatively, it is possible that both can be in use at the same time, provided that one is made to not respond to a MIN-based termination message, even if only while the other is in use.)

Referring to FIGS. 1 and 2 again, the process of restricting a MIN to be associated with at most one mobile station that is arranged to respond to a MIN-based termination message can be carried out, at least in part, by control logic 20 such as controller 40, possibly in combination with other entities (man or machine). Controller 40 is optimally positioned to carry out this process, because controller 40 preferably has access to the profile store 42 and is preferably involved with creation (addition or revision) of the profiles and with application of the profiles. (To the extent these functions are carried out by other entities instead, those other entities may carry out the process of restricting MIN associations.)

For example, when a service provider first creates a MIN profile or first associates an ESN with the MIN, an administrator may enter the profile data into a computer terminal, which then forwards the profile data to controller 40 to provision the profile in profile store 42. At that point, controller 40 can apply program logic (e.g., software-based logic) to determine whether to allow the ESN to be associated with the MIN, in the manner described above. Similarly, when a mobile station registers in a serving system and a registration message is passed up to controller 40, controller 40 can refer to the applicable MIN profile and perhaps to a separate table of ESNs, to determine whether to allow registration, also as described above. Further, upon registration, controller 40 may send to the serving system (e.g., MSC 30) a local profile for the MIN.

Figure 3:
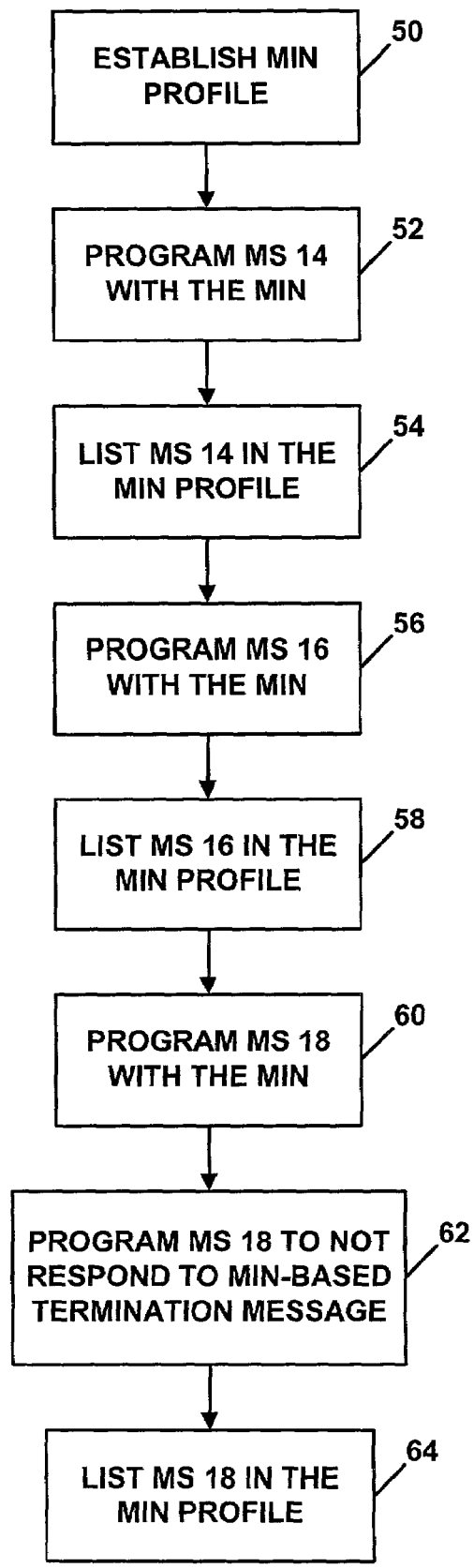
FIG. 3 is a flow chart illustrating how a subscriber profile can be established to associate a subscriber ID with multiple subscriber stations.

Referring now to FIG. 3, a flow chart is provided to illustrate how a MIN profile might be established in the arrangement shown in FIG. 2. For this example, assume that mobile station 14 is a cellular telephone that is arranged to respond to a MIN-based termination message, mobile station 16 is a PCMCIA wireless modem card that is arranged to not respond to a MIN-based termination message, and mobile station 18 is a cellular telephone that can be programmed to either respond to a MIN-based termination messages or not. Assume further that the owner or operator of these three mobile stations contracts with a service provider to provide wireless communication service for each of the mobile stations.

At step 50, the service provider may establish a MIN for the subscriber and may establish a subscriber profile for the MIN in profile store 42. FIG. 4 illustrates an example of such a subscriber profile, in the form of a table 102 with rows (records) corresponding to each ESN to be associated with the MIN, and with columns (fields) providing information such as (i) ESN, (ii) termination capability of the associated mobile station, (iii) an indication of whether the mobile station is currently registered, and (iv) the location of the associated mobile station (e.g., the identity of the MSC currently serving the mobile station), for instance.

At steps 52 and 54, the service provider might first program mobile station 14 with the MIN and establish a row 104 for mobile station 14 in table 100. As shown in FIG. 4, row 104 may indicate that mobile station 14 (i) has ESN-14 (which would typically be a lengthy string of digits), (ii) is arranged to respond to a MIN-based termination message (indicated by the "MT" code), (iii) is not yet registered (as it has not yet been powered on in a serving system), and (iv) does not have a current location (because it is not yet registered).

At steps 56 and 58, the service provider might then program mobile station 16 with the same MIN and establish a row 106 for mobile station 16 in table 100. As shown in FIG. 4, row 104 may indicate that mobile station 16 (i) has ESN-16, (ii) is arranged to not respond to a MIN-based termination message (indicated by an absence of the "MT" code), (iii) is not yet registered, and (iv) does not have a current location.

In turn, at step 60, the service provider may program mobile station 18 with the same MIN as well. Knowing that the MIN is already associated with a mobile station that is arranged to respond to a MIN-based termination message (namely, mobile station 14), the service provider may conclude that it cannot serve mobile station 18 under the same MIN if mobile station 18 would also respond to a MIN-based termination message. Therefore, at step 62, the service provider may program mobile station 18 to not respond to a MIN based termination message. At step 65, the service provider may then establish a row 108 for mobile station 18 in table 100. As shown in FIG. 4, row 106 may indicate that mobile station 18 (i) has ESN-18, (ii) is arranged to not respond to a MIN-based termination message, (iii) is not yet registered, and (iv) does not have a current location.

Figure 5:
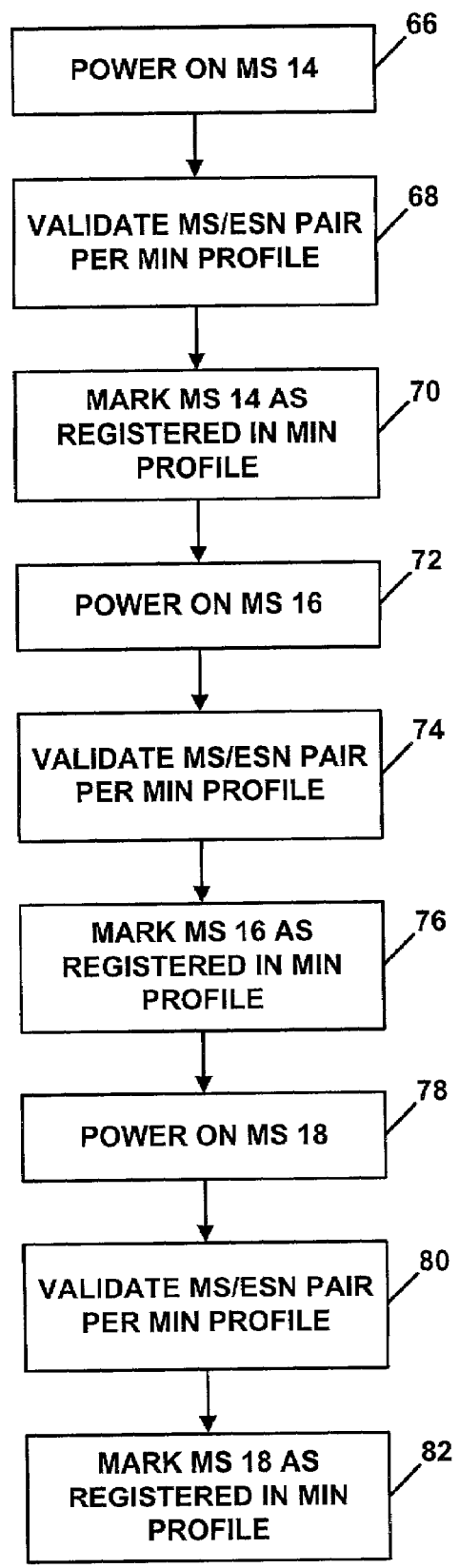
FIG. 5 is a flow chart illustrating how multiple subscriber stations can be registered at once under a common subscriber ID.

Referring next to FIG. 5, a flow chart is provided to illustrate concurrent registration of mobile stations 14, 16 and 18 under their common MIN. In FIG. 5, at step 66, assume the subscriber turns on mobile station 14 in the system served by MSC 30. As a result, mobile station 14 may send a registration message over air interface 26 to the serving system, identifying the mobile station by the MIN and its ESN (ESN-14). MSC 30 may then send the registration message to controller 40 together with an identification of the MSC (an MSC-ID). At step 68, controller 40 may then authenticate the mobile station, by noting that the ESN-14 is listed in the MIN profile. (Commonly, the controller would engage in further authentication, through interaction with an authentication controller, the details of which are not described here.) In turn, at step 70, the controller may note in row 104 of the MIN profile that mobile station 14 is registered and is located in the system served by MSC 30.

The controller may then send a response message back to MSC 30, providing the MSC with a local copy of the MIN profile, listing ESN-14 as registered. And the serving system may send an acknowledgement signal to mobile station 14, thereby completing the registration process.

Assume next that, at step 72, the subscriber turns on mobile station 16 in the same serving system. Mobile station 16 may then send a registration message over air interface 26 to the serving system, identifying itself by the MIN and its ESN (ESN-16). MSC may forward the registration message to controller 40, and, at step 74 and 76, the controller may authenticate the mobile station and may note the state (registered) and location (MSC-ID) of the mobile station in row 106 of the MIN profile. The controller may then send a response message to MSC 30, providing the MSC with a local copy of the MIN profile, now listing both ESN-14 and ESN-16 as registered. And the serving system may send an acknowledgement to mobile station 16.

In turn, at step 78, assume that the subscriber turns on mobile station 18 in the same serving system. Mobile station 18 may similarly send a registration message over air interface 26 to the serving system, identifying itself by the MIN and its ESN (ESN-18). MSC may forward the registration message to controller 40, and, at step 80 and 82, the controller may authenticate the mobile station and may note the state (registered) and location (the MSC-ID) of the mobile station in row 108 of the MIN profile. The controller may then send a response message to MSC 30, providing the MSC with a local copy of the MIN profile, now listing ESN-14, ESN-16 and ESN-18 as registered. And the serving system may send an acknowledgement to mobile station 18.

Figure 6:
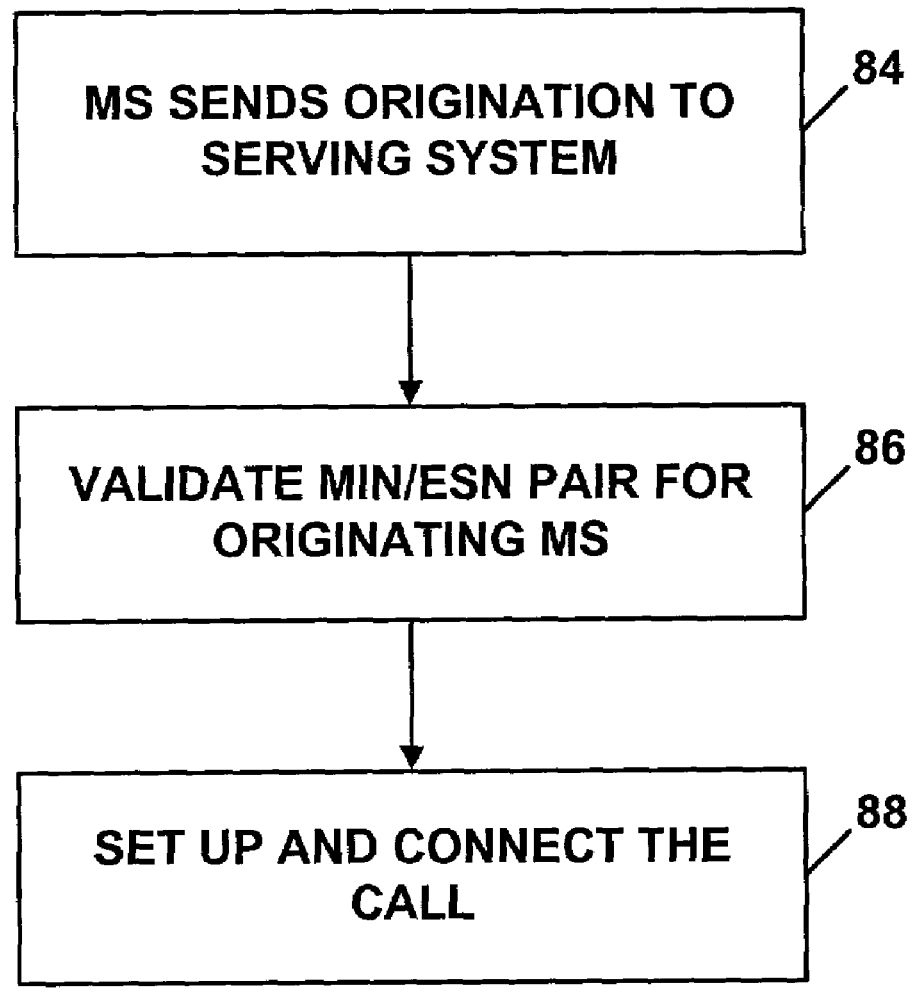
FIG. 6 is a flow chart illustrating how any of the concurrently registered subscriber stations can originate a call.

Any of the mobile stations can then originate a call, as shown next by the flow chart set forth in FIG. 6. In doing so, at step 84, the mobile station would send an origination message over air interface 26 to the serving system, identifying itself by its MIN and its ESN. At step 86, the MSC may then validate the MIN/ESN pair by reference to its local copy of the MIN profile. Alternatively, the MSC may send the origination request up to controller 40, and the controller may validate the MIN/ESN pair by reference to the MIN profile set forth in profile store 42. Upon successful validation, at step 88, the serving system may then set up and connect the call.

Figure 7:
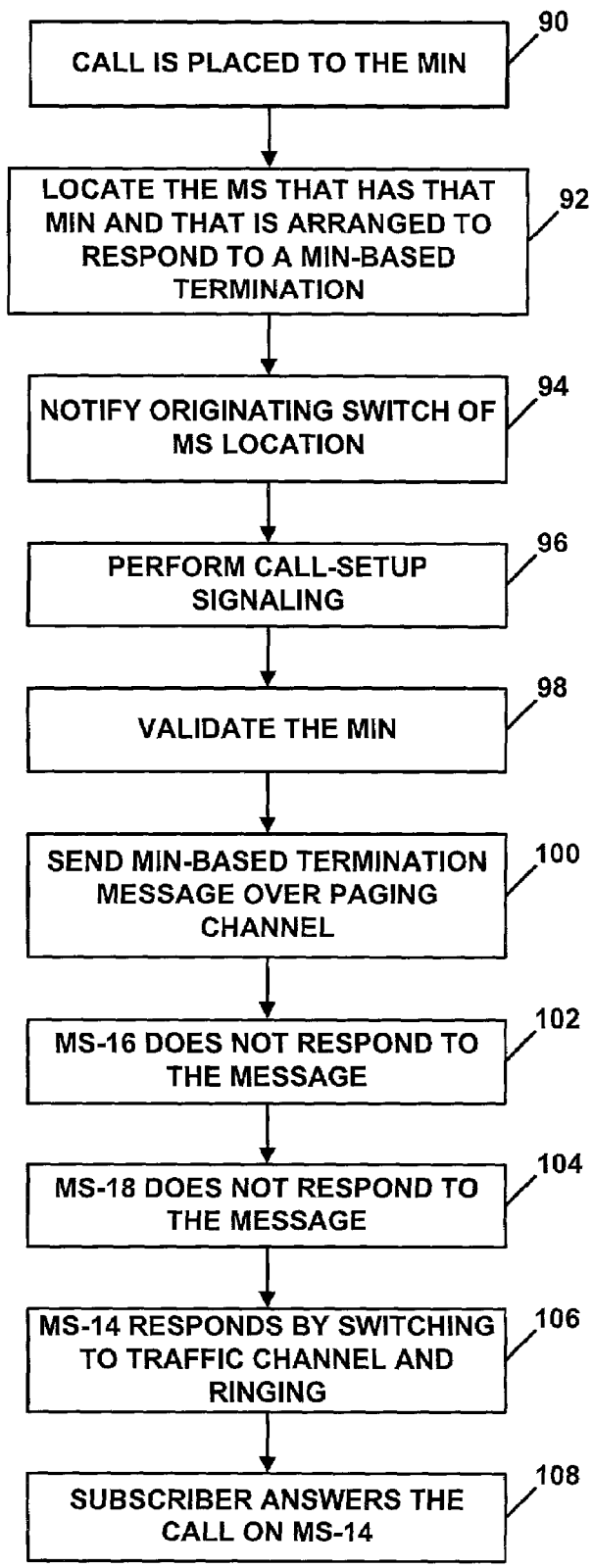
FIG. 7 is a flow chart illustrating how only one of the subscriber stations will respond to a particular type of termination message, thereby avoiding termination conflicts among the subscriber stations.

In turn, in accordance with the exemplary embodiment, when a call is placed to the common MIN, only mobile station 14 will respond. FIG. 7 illustrates this process. As shown in FIG. 7, at step 90, assume that a person at landline telephone 46 dials the MIN. In response, SSP 44 may signal up to controller 40 to find out where to route the call. At step 92, controller 40 may then consult the MIN profile in profile store 42 and (i) identify mobile station 14 (ESN-14) as the mobile station that is arranged to respond to a MIN-based termination message for that MIN and (ii) determine that mobile station 14 is located in the system being served by MSC 30. Consequently, at step 94, controller 40 may send a response message to SSP 44, instructing SSP 44 to route the call to MSC 30.

At step 96, SSP 44 may then engage in ISUP signaling communication with MSC 30, seeking to set up the call to the MIN. In this process, at step 98, MSC 30 may validate the MIN by reference to its local copy of the MIN profile (ensuring that the MIN is associated with a registered mobile station that is arranged to respond to a MIN-based termination message). Alternatively, MSC 30 may signal to controller 40, and the controller may validate the MIN by reference to the MIN profile.

Upon successful validation, at step 100, MSC 30 may instruct the base station to send a general page message in the paging channel over air interface 26, in an effort to terminate the call to the mobile station that has the MIN, and the base station would do so. (Sending such a message over the paging channel may be considered "broadcasting" the message, in the sense that multiple devices may be monitoring the paging channel and may therefore see the message.) As described above, the general page message would indicate the MIN, and the CAI and BAA flags would be set in the message. At step 102, mobile station 16 may receive the general page message and may ignore the CAI and BAA flags and therefore not respond to the general page message. At step 104, mobile station 18 may similarly receive and not respond to the general page message. At step 106, however, mobile station 14 may receive the general page message and, in response to the CAI and BAA flags being set, switch to a designated traffic channel and begin to ring. Finally, at step 108, the subscriber may press TALK on mobile station 14 to answer the call.

Although the arrangement described above specifies that mobile stations 14, 16 and 18 are all operating in the same serving system (and, perhaps, on the same frequency), the exemplary embodiment will equally allow the mobile stations to be operating in completely different serving systems. Origination from any of the mobile stations would work as described above. Similarly, termination would work the same. Namely, when controller 40 receives a request to identify the location of the mobile station that will receive a call to the MIN, controller 40 can readily identify the location of the one mobile station that is arranged to respond to a MIN-based termination message for that MIN. The originating switch could then route the call to the system serving that mobile station, even if the subscriber's other mobile stations were currently registered in a different serving system.

An exemplary embodiment of the present invention has been described above. Those skilled in the art will understand, however, that changes and modifications may be made to this embodiment without departing from the true scope and spirit of the present invention, which is defined by the claims.

For example, although the description above focuses on concurrent operation of multiple mobile stations under a common MIN, the system could extend as well to facilitating concurrent operation of other types of subscriber stations generally under a common subscriber ID (e.g., a subscriber account number or network address). In that event, at most one of the subscriber stations having the subscriber ID could be arranged to respond to a particular predetermined type of termination signal (akin to a MIN-based termination message), while all of the subscriber stations that have the subscriber ID would be arranged to not respond to that particular type of termination signal. In another arrangement, the particular type of termination signal may carry a parameter that identifies it as such, and one of the subscriber stations can be programmed to detect that parameter and to responsively disregard the signal.

Other examples are possible as well.

We claim:

1. A method comprising:
   maintaining a subscriber profile that associates multiple subscriber stations with a common subscriber ID;
   arranging a first subscriber station of the multiple subscriber stations to respond to a predetermined type of termination signal having the common subscriber ID included to identify an intended destination of the terminal signal;
   arranging each remaining subscriber station of the multiple subscriber stations (i) with information regarding the common subscriber ID, and (ii) to ignore the predetermined type of termination signal having the common subscriber ID included to identify the intended destination of the termination signal;
   using the subscriber profile to authorize an origination from any of the multiple subscriber stations; and
   in response to a request to terminate a predetermined type of communication to the common subscriber ID, broadcasting the predetermined type of termination signal having the common subscriber ID included to identify the intended destination of the termination signal, wherein only the first subscriber station will respond to the termination signal.

2. The method of claim 1, wherein the predetermined type of communication comprises a call directed to the subscriber ID.

3. The method of claim 1, wherein the predetermined type of termination signal comprises a paging channel message.

4. The method of claim 3, wherein the predetermined type of termination signal comprises a general page message.

5. The method of claim 1, wherein the predetermined type of termination signal includes at least one parameter indicating that it is the predetermined type of termination signal.

6. The method of claim 1, further comprising:
   programming all of the subscriber stations except the first subscriber station to ignore the predetermined type of termination signal.

7. The method of claim 1, further comprising programming only the first subscriber station to respond to the predetermined type of termination signal broadcast to the subscriber ID.

8. The method of claim 1, wherein the subscriber profile comprises a table having a number of records each corresponding to a respective one of the subscriber stations.

9. The method of claim 1, wherein the first subscriber station is a mobile station, and wherein the method further comprises:
   receiving a registration message indicating that the first subscriber station is located in a particular location, wherein broadcasting the predetermined type of termination signal comprises broadcasting the predetermined type of termination signal into the particular location.

10. The method of claim 9, further comprising:
    in response to the registration message, indicating in the subscriber profile that the first subscriber station is physically located in the particular location; and
    using the subscriber profile to determine that the predetermined type of termination signal should be broadcast into the particular location.

11. The method of claim 1, wherein each subscriber station of the plurality of subscriber stations is a mobile station having a respective electronic signal number (ESN), wherein the common subscriber ID comprises a mobile identification number (MIN), and wherein:
    maintaining a subscriber profile that associates multiple subscriber stations with the common subscriber ID comprises maintaining a subscriber profile that associates the common MIN with the ESNs of the mobile station.

12. The method of claim 11, wherein broadcasting the predetermined type of termination signal comprises sending the predetermined type of termination signal over an air interface.

13. The method of claim 1, wherein the subscriber ID comprises a telephone number and the predetermined type of communication comprises a telephone call, the method further comprising receiving the request to terminate the predetermined type of communication to the subscriber ID.

14. The method of claim 1, wherein each subscriber station includes a respective ID, wherein the subscriber profile associates the subscriber ID with the station IDs of the multiple subscriber stations, and wherein using the subscriber profile to authorize an origination from any of the subscriber stations comprises:
    in response to an origination request that identifies the subscriber ID and a particular station ID, determining that the subscriber profile associates the subscriber ID with the particular station ID.

15. The method of claim 1, wherein the predetermined type of termination signal comprises a MIN-based termination signal.

16. A method of facilitating operation of multiple subscriber terminals under a single subscriber account number, wherein each subscriber terminal has a respective unique serial number, the method comprising:
    maintaining a profile authorizing the multiple subscriber terminals;
    arranging a first subscriber station of the multiple subscriber stations to respond to a predetermined type of termination signal having a subscriber ID included to identify an intended destination of the terminal signal, wherein the subscriber ID is indicative of the single subscriber account number;
    arranging each remaining subscriber station of the multiple subscriber stations to ignore the predetermined type of termination signal having the subscriber ID included to identify the intended destination of the termination signal;
    responding to originations from any of the subscriber terminals, wherein an origination carries a unique combination of subscriber account number and serial number and thereby distinguishes the originating subscriber terminal; and
    in response to a request to terminate a predetermined type of communication to the subscriber ID, broadcasting the predetermined type of termination signal having the subscriber ID included to identify the intended destination of the termination signal, whereby only the first subscriber station will respond to the termination signal.

17. In a communication system of they type having a serving system for serving a plurality of subscriber stations, wherein each subscriber station is associated with a respective station ID and a respective subscriber ID, and wherein (i) when a given subscriber station seeks to originate a communication, the given subscriber station transmits its associated station ID and subscriber ID to the serving system, and the serving system uses that station ID and subscriber ID cooperatively to authenticate the given subscriber station, and (ii) when the serving system seeks to terminate a call to the given subscriber station, the serving system broadcasts a termination message having the subscriber ID included that identifies an intended destination of the termination message, and the given subscriber station receives the termination message, > a method of facilitating operation of multiple subscriber stations under a common subscriber ID, the method comprising:
>
>> maintaining a subscriber profile for the given subscriber ID, the subscriber profile associating a plurality of station IDs with the given subscriber ID, wherein a first station ID of the plurality of station IDs is associated with a first subscriber station that is responsive to a termination message having the subscriber ID included to identify the intended destination of the termination message, but wherein each other station ID of the plurality of station IDs is associated with a respective subscriber station that is not responsive to such a termination message,
>
> whereby the method is operable such that, when the serving system seeks to terminate a call to the given subscriber ID, the serving system broadcasts a termination message having the subscriber ID included to identify the intended destination of the termination message, and the first subscriber station responds to the termination message, and
>
> whereby the method is operable such that, when any particular subscriber station associated with one of the station IDs of the plurality of station IDs seeks to originate a communication, the particular subscriber station transmits its station ID and subscriber ID to the serving system, and the serving system uses that staion DI and subscriber ID cooperatively to authenticate the particular subscriber station with reference to the subscriber profile.

* * * * *